United States Patent
Gao

(10) Patent No.: US 11,354,068 B2
(45) Date of Patent: Jun. 7, 2022

(54) INFORMATION PROCESSING APPARATUS, RECORDING MEDIUM FOR INFORMATION PROCESSING PROGRAM, AND INFORMATION PROCESSING METHOD

(71) Applicant: FUJITSU LIMITED, Kawasaki (JP)

(72) Inventor: Hong Gao, Kunitachi (JP)

(73) Assignee: FUJITSU LIMITED, Kawasaki (JP)

( * ) Notice: Subject to any disclaimer, the term of this patent is extended or adjusted under 35 U.S.C. 154(b) by 154 days.

(21) Appl. No.: 17/005,388

(22) Filed: Aug. 28, 2020

(65) Prior Publication Data

US 2021/0081143 A1   Mar. 18, 2021

(30) Foreign Application Priority Data

Sep. 13, 2019   (JP) .............................. JP2019-167710

(51) Int. Cl.
| | |
|---|---|
| G06F 9/44 | (2018.01) |
| G06F 3/06 | (2006.01) |
| G06F 9/448 | (2018.01) |
| G06F 8/72 | (2018.01) |
| G06F 8/41 | (2018.01) |

(52) U.S. Cl.
CPC .......... G06F 3/0659 (2013.01); G06F 3/0604 (2013.01); G06F 3/0644 (2013.01); G06F 3/0673 (2013.01); G06F 8/72 (2013.01); G06F 9/4494 (2018.02); *G06F 8/447* (2013.01)

(58) Field of Classification Search
CPC .................................................. G06F 9/4494
See application file for complete search history.

(56) References Cited

U.S. PATENT DOCUMENTS

| | | | |
|---|---|---|---|
| 2003/0137438 A1* | 7/2003 | Yokose | H03M 7/48 341/106 |
| 2005/0027997 A1* | 2/2005 | Ueno | G06F 21/34 713/193 |

(Continued)

FOREIGN PATENT DOCUMENTS

| | | |
|---|---|---|
| JP | 2010-271931 A | 12/2010 |
| WO | 2010/134370 A1 | 11/2010 |
| WO | 2013/030860 A1 | 3/2013 |

OTHER PUBLICATIONS

Extended European Search Report dated Feb. 8, 2021 for corresponding European Patent Application No. 20192624.3, 8 pages.

(Continued)

*Primary Examiner* — Jae U Jeon
(74) *Attorney, Agent, or Firm* — Fujitsu Patent Center

(57) ABSTRACT

An information processing apparatus, includes a computation processing device that includes a memory and a processor coupled to the memory; and a storage device that stores a program, and wherein the processor is configured to: store, in the memory, a first storage area for first data that is assigned to a computation target by data definition for the computation target written in the program and a second storage area for second data that is assigned to the computation target instead of the first data, simplify the program, when the data definition for the computation target is omitted by executing the simplified program, output the second data, and perform the computation by using the output second data.

10 Claims, 24 Drawing Sheets

```
401 ~ func:
411 ~   <<LOOP BODY>>
412 ~   end thread

1501 ~ AC_Barrier(mode):
          if (mode==0) break
          else if (mode==1):
            start timer
            start thread
            while (time<T orcount_end_threadM) wait()
          else:
            start thread
            while(count_end_thread<N) wait()

1502 ~   set  0 --> i
1511 ~   set_AC_flag(A, N, AUX)
1512 ~   start_AC_region(mode)
         LoopBegin:
413 ~      crete_thread(func, i)
           i++
           if (i < N) then goto LoopBegin
416 ~    AC_barrier(mode)
         LoopEnd:
415 ~    <<PROCESS AFTER LOOP EXECUTION>>
         END:
1513 ~   end_AC_region(mode)
```

(56) References Cited

U.S. PATENT DOCUMENTS

| | | | |
|---|---|---|---|
| 2010/0229162 A1* | 9/2010 | Hada | G06F 8/45 |
| | | | 712/201 |
| 2014/0189416 A1 | 7/2014 | Tajima et al. | |
| 2016/0196112 A1* | 7/2016 | Edwards | G06F 8/30 |
| | | | 717/107 |

OTHER PUBLICATIONS

Hoffmann, Henry et al., "Using Code Perforation to Improve Performance, Reduce Energy Consumption, and Respond to Failures", XP055770246, Retrieved from the Internet:URL:https://people.csail.mit.edu/rinard/techreport/MIT-CSAIL-TR-2009-042.pdf [retrieved on Jan. 30, 2021], 21 pages, Sep. 3, 2009.

Baek, Woongki et al., "Green: A Framework for Supporting Energy-Conscious Programming using Controlled Approximation", Proceedings of the 2010 ACM SIGPLAN Conference on Programming Language Design and Implementation: Jun. 5-10, 2010, pp. 198-209, Jun. 5, 2010.

\* cited by examiner

FIG. 1A

```
       set 0 --> i
       Loop1Begin:
101~      ... --> D
102~      store D --> [A + i]
          i++
          if i < N then goto Loop1Begin
       Loop1END
       set 0 --> i
       set 0 --> sum
       Loop2Begin:
103~      load [A + i] --> D
104~      sum + D --> sum
          i++
          if i < N then goto Loop2Begin
       Loop2END:
       print sum
```

FIG. 1B

```
       set 0 --> i
       Loop1Begin:
111~      if (i mod 2 == 0) then
              i++
              go to Loop1Begin
101~      ... --> D
102~      store D --> [A + i]
          i++
          if i < N then goto Loop1Begin
       Loop1END:
       set 0 --> i
       set 0 --> sum
       Loop2Begin:
103~      load [A + i] --> D
104~      sum + D --> sum
          i++
          if i < N then goto Loop2Begin
       Loop2END:
       print sum
```

FIG. 2A

```
       set 0 --> i
       set 0 --> R
       Loop1Begin:
201 ─── mult R, ..., --> ...
202 ─── ...  --> R
       i++
       if i < N then goto Loop1Begin
       Loop1END:
       print R
```

FIG. 2B

```
       set 0 --> i
       set 0 --> R
       Loop1Begin:
       ⎧ if(i mod2==0)then
211 ──⎨   i++
       ⎩   goto Loop1Begin
201 ─── mult R, ..., --> ...
202 ─── ...  --> R
       i++
       if i < N then goto Loop1Begin
       Loop1END:
```

FIG. 4A

```
401~ func:
411~   <<LOOP BODY>>
412~   end thread

402~ Barrier:
       start thread
       while(count_end_thread <N) wait()

403~ set 0 --> i
     LoopBegin:
413~   create_thread (func, i)
       i++
       if (i<N) then goto LoopBegin
414~   barrier()
     LoopEnd:
415~   <<PROCESS AFTER LOOP EXECUTION>>
```

FIG. 4B

```
401~ func:
411~   <<LOOP BODY>>
412~   end thread

404~ AC_Barrier:
       start timer
       start thread
       while(count_end_thread <M or time<T):
         wait()

405~ set 0 --> i
     LoopBegin:
413~   create_thread (func, i)
       i++
       if (i<N) then goto LoopBegin
416~ AC_barrier()
     LoopEnd:
415~   <<PROCESS AFTER LOOP EXECUTION>>
```

FIG. 7

| Address | Data | Mode | Aux | State |
|---------|------|------|-----|-------|
| —       | —    | —    | —   | —     |

FIG. 8

| Register | Data | Mode | Aux | State |
|----------|------|------|-----|-------|
| —        | —    | —    | —   | —     |

FIG. 9

```
         set 0 --> i
901 ─── set_AC_flag(A, N, AUX)
902 ─── start_AC_region(mode)
         Loop1Begin:
          ┌ if(i mod2==0)&&(mode<2))then
911 ─┤      i++
          └ goto Loop1Begin
 101 ───   ... --> D
 102 ───   store D --> [A + i]
           i++
           if i < N then goto Loop1Begin
         Loop1END:
         set 0 --> i
         set 0 --> sum
         Loop2Begin:
 103 ───   load [A + i] --> D
 104 ───   sum + D --> sum
           i++
           if i < N then goto Loop2Begin
         Loop2END:
903 ─── end_AC_region(mode)
         print sum
```

FIG. 10

| Address | Data | Mode | Aux | State |
|---|---|---|---|---|
| A + 0 | — | — | AUX | — |
| A + 1 | — | — | AUX | — |
| ... | — | — | AUX | — |
| A + N - 1 | — | — | AUX | — |

FIG. 11

| Address | Data | Mode | Aux | State |
|---------|------|------|-----|-------|
| A + 0 | — | mode | AUX | 0 |
| A + 1 | — | mode | AUX | 0 |
| ... | — | mode | AUX | 0 |
| A + N - 1 | — | mode | AUX | 0 |

FIG. 12

```
        set 0 --> i
        set 0 --> R
1201 ~  set_AC_flag(R, AUX)
1202 ~  start_AC_region(mode)
        Loop1Begin:
              if ((i mod 2 == 0) && (mode < 2)) then
1211 ~           i++
             1212 ~ clear_AC_flag(R)
                 goto Loop1Begin
  201 ~  mult R, ... --> ...

202 ~  ... -> R
        i++
        if i < N then goto Loop1Begin
        Loop1END:
1203 ~  end_AC_region(mode)
```

FIG. 13

| Register | Data | Mode | Aux | State |
|----------|------|------|-----|-------|
| R        | —    | —    | AUX | —     |

FIG. 14

| Register | Data | Mode | Aux | State |
|---|---|---|---|---|
| R0 | — | mode | AUX | 0 |
| R1 | — | mode | AUX | 0 |
| ... | — | mode | AUX | 0 |
| Rn | — | mode | AUX | 0 |

FIG. 15

```
401 ─── func:
411 ───   <<LOOP BODY>>
412 ───   end thread

1501 ── AC_Barrier(mode):
           if (mode==0) break
           else if (mode==1):
              start timer
              start thread
              while (time<T or count_end_thread<M) wait()
           else:
              start thread
              while(count_end_thread<N) wait()

1502 ──    set 0 --> i
1511 ──    set_AC_flag(A, N, AUX)
1512 ──    start_AC_region(mode)
           LoopBegin:
413  ──      crete_thread(func, i)
              i++
              if (i < N) then goto LoopBegin
416  ──    AC_barrier(mode)
           LoopEnd:
415  ──      <<PROCESS AFTER LOOP EXECUTION>>
           END:
1513 ──    end_AC_region(mode)
```

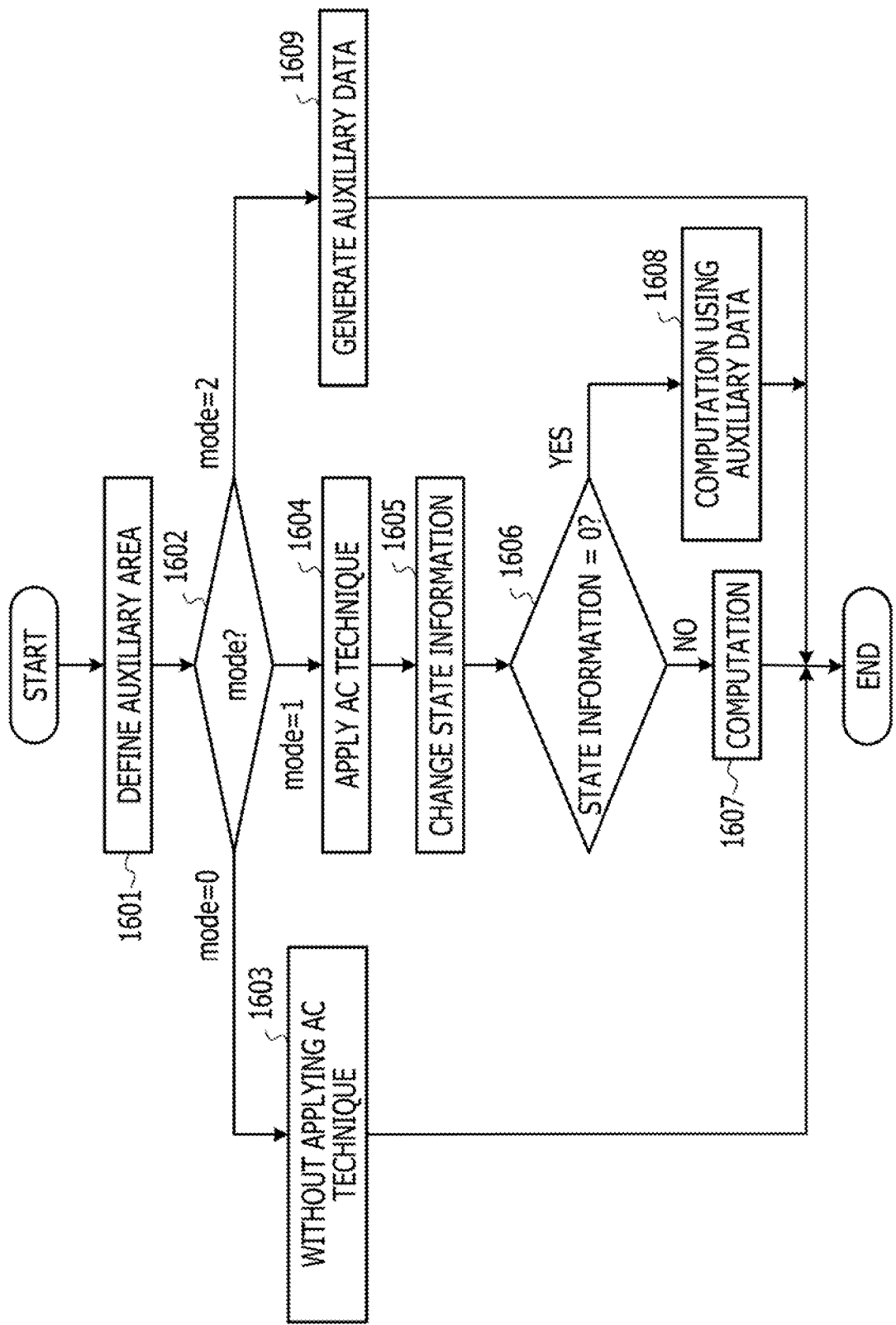

FIG. 17A

```
i = 0;
do {
   <<LOOP BODY>>
   i++;
} while ( i < N ) ;
<<PROCESS AFTER LOOP EXECUTION>>
```

FIG. 17B

```
   set 0 -- > i
LoopBegin
   <<LOOP BODY>>
   i++;
   if ( i < N ) thergoto LoopBegin
LoopEnd
   <<PROCESS AFTER LOOP EXECUTION>>
```

FIG. 18A

```
set_AC_flag(A, N, AUX)
start_AC_region(mode)
```

FIG. 18B

```
if ((i mod 2 == 0) && (mode < 2)) then
  i++;
   goto Loop1Begin
```

FIG. 18C

```
end_AC_region(mode)
```

FIG. 19

```
    set 0 --> i
set_AC_flag(A, N, AUX)
start_AC_region(mode)
 LoopBegin :
    if ((i mod 2 == 0) && (mode < 2)) then
      i++
      goto Loop1Begin
   <<LOOP BODY>>
   i++
   if (i < N)  then  goto LoopBegin
 LoopEnd:
     <<PROCESS AFTER LOOP EXECUTION>>
 END:
 end_AC_region(mode)
```

FIG. 20A

```
set_AC_flag(R, AUX)
start_AC_region(mode)
```

FIG. 20B

```
if ((i mod 2 == 0) && (mode < 2)) then
  i++;
  clear_AC_flag(R)
  goto Loop1Begin
```

FIG. 20C

```
end_AC_region(mode)
```

FIG. 21

```
   set 0 -- > i
set_AC_flag(R, AUX)
start_AC_region(mode)
LoopBegin:
   if ((i mod 2 == 0) && (mode < 2)) then
      i++
      goto Loop1Begin
   <<LOOP BODY>>
   i++
   if (i < N)  then  goto LoopBegin
LoopEnd:
      <<PROCESS AFTER LOOP EXECUTION>>
END:
end_AC_region(mode)
```

FIG. 22A

```
i = 0;
do_parallel {
    <<LOOP BODY>>
    i++;
} while (i < N);
<<PROCESS AFTER LOOP EXECUTION>>
```

FIG. 22B

```
  set 0 --> i
LoopBegin
  create_thread(func, i)
  i++;
  if (i < N) then goto LoopBegin
barrier()
LoopEnd
    <<PROCESS AFTER LOOP EXECUTION>>
```

FIG. 22C

```
func:
    <<LOOP BODY>>
    end_thread
```

FIG. 23

```
   set 0 -- > i
set_AC_flag(A, N, AUX)
start_AC_region(mode)
LoopBegin :
   create_thread(func, i)
   i++
   if (i < N) thengoto LoopBegin
AC_barrier(mode)
LoopEnd:
   <<PROCESS AFTER LOOP EXECUTION>>
END:
end_AC_region(mode)
```

INFORMATION PROCESSING APPARATUS, RECORDING MEDIUM FOR INFORMATION PROCESSING PROGRAM, AND INFORMATION PROCESSING METHOD

CROSS-REFERENCE TO RELATED APPLICATION

This application is based upon and claims the benefit of priority of the prior Japanese Patent Application No. 2019-167710, filed on Sep. 13, 2019, the entire contents of which are incorporated herein by reference.

FIELD

The present disclosure relates to an information processing apparatus, a recording medium for an information processing program, and an information processing method.

BACKGROUND

In recent years, it has been said that Moore's law in terms of improvement in computer performance will come to the end soon because further miniaturization of integrated circuits is becoming difficult. Further miniaturization would rather increase leak current and would not contribute to decrease in the power supply voltage, and thus, electric power consumption would not decrease. There is a limit to electric power consumption allowed for one chip. However, it is expected that electric power consumption of computers will increase rapidly because calculation needs will increase in the digital transformation (DX) era.

In this regard, approximate computing (AC) technique is drawing attention as a technique for achieving lower electric power consumption, other than semiconductor process engineering. The AC technique makes it possible to execute a program at a higher speed and reduce electric power consumption by omitting execution of part of the program. The AC technique includes techniques such as AC parallelization, loop perforation, and task skipping.

AC parallelization is a process of cancelling in the middle a waiting process of waiting for multiple processes written in a program and being executed in parallel to be completed, and loop perforation is a process of skipping part of repetition of a loop process. Task skipping is a process of skipping execution of part of program code.

In relation to efficient use of calculation processing time and calculation processing performance of an information processing apparatus, there is known a data processing system that extracts multiple parts of data from a population of data for calculation processing and executes calculation processing on each part of data (for example, see Japanese Laid-open Patent Publication No. 2010-271931). The information processing apparatus in this data processing system executes calculation processing indicated by a calculation processing request from a terminal sequentially on each part of data, and every time the information processing apparatus obtains the calculation processing result on each part of data, the information processing apparatus returns the calculation processing result to the terminal.

For example, Japanese Laid-open Patent Publication No. 2010-271931, and the like are disclosed.

SUMMARY

According to an aspect of the embodiments, an information processing apparatus, includes a computation processing device that includes a memory and a processor coupled to the memory; and a storage device that stores a program, and wherein the processor is configured to: store, in the memory, a first storage area for first data that is assigned to a computation target by data definition for the computation target written in the program and a second storage area for second data that is assigned to the computation target instead of the first data, simplify the program, when the data definition for the computation target is omitted by executing the simplified program, output the second data, and perform the computation by using the output second data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 1A and 1B are diagrams illustrating programs for calculating the sum total of the elements of array;

FIGS. 2A and 2B are diagrams illustrating programs for calculating the data of register;

FIGS. 4A and 4B are diagrams illustrating programs for calculating the sum total of the elements of array using parallel processing;

FIG. 7 is a diagram illustrating auxiliary areas in a load/store buffer;

FIG. 8 is a diagram illustrating auxiliary areas in a register file;

FIG. 9 is a diagram illustrating a program created by adding a variable indicating "Mode" to a program for calculating the sum total of the elements of array;

FIG. 10 is a diagram illustrating entries in the load/store buffer;

FIG. 11 is a diagram illustrating entries in the load/store buffer in which the execution modes are stored;

FIG. 12 is a diagram illustrating a program created by adding a variable indicating "Mode" to a program for calculating the data of register;

FIG. 13 is a diagram illustrating an entry in the register file;

FIG. 14 is a diagram illustrating entries in the register file in which the execution modes are stored;

FIG. 15 is a diagram illustrating a program created by adding a variable indicating "Mode" to a program that use parallel processing;

FIG. 16 is a flowchart of an instruction process;

FIGS. 17A and 17B are diagrams illustrating a first conversion process;

FIGS. 18A to 18C are diagrams illustrating instructions that are inserted in the case where the computation targets are the elements of array;

FIG. 19 is a diagram illustrating a program that is generated in the case where the computation targets are the elements of array;

FIGS. 20A to 20C are diagrams illustrating instructions that are inserted in the case where the computation target is register;

FIG. 21 is a diagram illustrating a program that is generated in the case where the computation target is register;

FIGS. 22A and 22C are diagrams illustrating a second conversion process;

FIG. 23 is a diagram illustrating a program for parallel processing that is generated in the case where the computation targets are the elements of array.

DESCRIPTION OF EMBODIMENTS

Figure 3A:
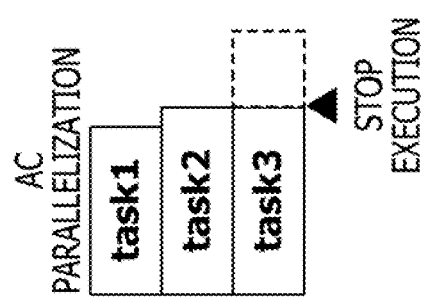
FIGS. 3A to 3C are diagrams illustrating serial processing, parallel processing, and parallel processing to which AC parallelization is applied.

In the case of applying AC techniques when executing a program, it is possible that a computation using computation targets is executed in the state in which data definition for part of the computation targets has been omitted and that the accuracy of the computation result is low.

Note that such a problem occurs not only in the case of applying AC techniques to a program but also in the case of applying various simplification processes for simplifying a program when the program is executed.

In one aspect, an object of the present disclosure is to avoid the situation in which computation accuracy is low even in the case where a program is simplified when being executed.

The following describes an embodiment in detail with reference to the drawings.

FIGS. 1A and 1B illustrate examples of programs for calculating the sum total of the elements of array A. FIG. 1A is illustrates an example of a program to which AC techniques are not applied. The program of FIG. 1A includes two loop processes: Loop1 and Loop2. Array A has N (N is an integer of 2 or more) elements.

The instruction 101 in Loop1 is an instruction to calculate the data of variable D, and the instruction 102 is a store instruction to store the data of variable D into element A[i] which is i-th (i=0 to N−1) element of array A. The instruction 103 of Loop2 is a load instruction to load the data of element A[i] into variable D, and the instruction 104 is an instruction to add the data of variable D to the data of variable sum, which means a sum total. Element A[i] is an example of a variable that is a computation target, the instruction 102 is an example of data definition for a computation target, and the instruction 103 is an example of a computation using a computation target.

FIG. 1B illustrates an example of a program created by applying loop perforation to the program of FIG. 1A. In the program of FIG. 1B, the if statement 111 is inserted in Loop of FIG. 1A.

The if statement 111 is a program for, if loop-counter i is an even number, incrementing loop-counter i by 1 and jumping to Loop1Begin. Hence, when loop-counter i is an odd number, the instruction 101 and the instruction 102 are executed, and data definition for element A[i] is performed. On the other hand, when loop-counter i is an even number, the instruction 101 and the instruction 102 are not executed, and data definition for element A[i] is omitted.

When the program of FIG. 18 is executed, since the data of element A[i] is not defined if loop-counter i is an even number, random undefined data may be inputted to element A[i]. In this case, the sum total including 50% undefined data is calculated in Loop2, it is possible that the accuracy of the calculated sum total is significantly low.

FIGS. 2A and 28 illustrate examples of programs for calculating the data of register R. FIG. 2A is illustrates an example of a program to which AC techniques are not applied. The program of FIG. 2A includes Loop1.

The instruction 201 of Loop1 is an instruction to perform calculation using the data of register R, and the instruction 202 is an instruction to calculate the data of register R. Register R is an example of a computation target, the instruction 202 is an example of data definition for a computation target, and the instruction 201 is an example of a computation using a computation target.

FIG. 28 illustrates an example of a program created by applying loop perforation to the program of FIG. 2A. In the program of FIG. 2B, the if statement 211 which is the same as the if statement 111 of FIG. 18 is inserted in Loop1 of FIG. 2A. Hence, the instruction 201 and the instruction 202 are executed only when loop-counter i is an odd number, and when loop-counter i is an even number, the instruction 201 and the instruction 202 are not executed, and data definition for register R is omitted.

When the program of FIG. 2B is executed, because when loop-counter i is an even number, the data of register R is not defined, the old data calculated in the immediately previous loop remains in register R. Hence, when loop-counter i is an odd number, it is possible that the accuracy of calculation result calculated according to the instruction 201 is significantly low.

Figure 3B:
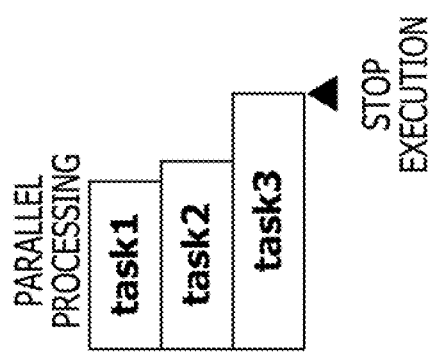
Figure 3C:
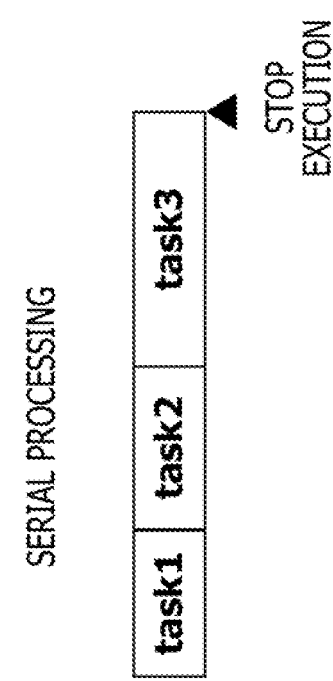

FIGS. 3A to 3C illustrate examples of serial processing, parallel processing, and parallel processing to which AC parallelization is applied. FIG. 3A is illustrates an example of serial processing. The task includes three subtasks of task1 to task3. These subtasks are executed serially in the order of task1, task2, and task3, and the execution of the task stops when the last task3 finishes.

FIG. 3B illustrates an example of parallel processing. In this case, task1 to task3 are executed in parallel with three processors, and barrier synchronization is performed for waiting for all the subtasks to be completed. In this example, the execution of the task stops when task3 having the longest execution time is completed. Since task1 to task3 are executed in parallel, the process efficiency is higher than serial processing.

FIG. 3C illustrates an example of parallel processing to which AC parallelization is applied. When the AC parallelization is applied, the barrier synchronization in the parallel processing of FIG. 3B is changed, and the execution of subtasks is canceled when the number of completed subtasks or the execution time reaches a specified value, without waiting for the completion of all the subtasks. For example, in the case of canceling execution when any two subtasks are completed, the execution of the task stops when task2 is completed, and the execution of task3 is canceled in the middle.

FIGS. 4A and 4B illustrate examples of programs for calculating the sum total of the elements of array A using parallel processing. FIG. 4A illustrates an example of a program to which AC techniques are not applied. The program 403 in FIG. 4A includes Loop.

The instruction 413 in Loop is an instruction to generate threads for executing function func with argument I. Each thread correspond to each subtask in FIG. 3B. Function func is a program like the library 401 and includes the loop body 411 and the function 412. The loop body 411 is a program the same as the instruction 101 and the instruction 102 in FIGS. 1A and 11, and the function 412 is a function to complete the execution of the threads.

The instruction 414 in Loop is a barrier synchronization instruction to wait for the execution of the generated N threads to be completed and calls a program like the library 402. The variable count_end_thread in the library 402 indicates the number of completed threads.

The process 415 after the loop execution in the program 403 is a process for calculating the sum total of the N elements in array A. Element A[i] is an example of a computation target, the instruction 102 included in the loop body 411 is an example of data definition for a computation target, and the process 415 after the loop execution is an example of a computation using a computation target.

FIG. 4B illustrates an example of a program created by applying AC parallelization to the program of FIG. 4A. In the program 405 in FIG. 4B, the instruction 414 in FIG. 4A is replaced with the instruction 416.

The instruction 416 is a barrier synchronization instruction to cancel the process of waiting for the execution of the N threads to be completed in the middle and calls a program like the library 404. The symbol M in the library 404 represents an integer smaller than N. The variable time represents the execution time that has elapsed since the start time of the parallel processing, and T is a time shorter than the execution time that is taken for all the threads to be completed. In this case, when M threads are completed or when the execution time reaches T, the execution of the remaining threads is canceled.

When the program of FIG. 4B is executed, since execution of some threads is canceled, and the data of element A[i] handled by the canceled threads is not defined, it is possible that random undefined data is inputted into element A[i]. In this case, because the sum total including the undefined data is calculated in the process 415 after the loop execution, it is possible that the accuracy of the calculated sum total is low.

Figure 5:
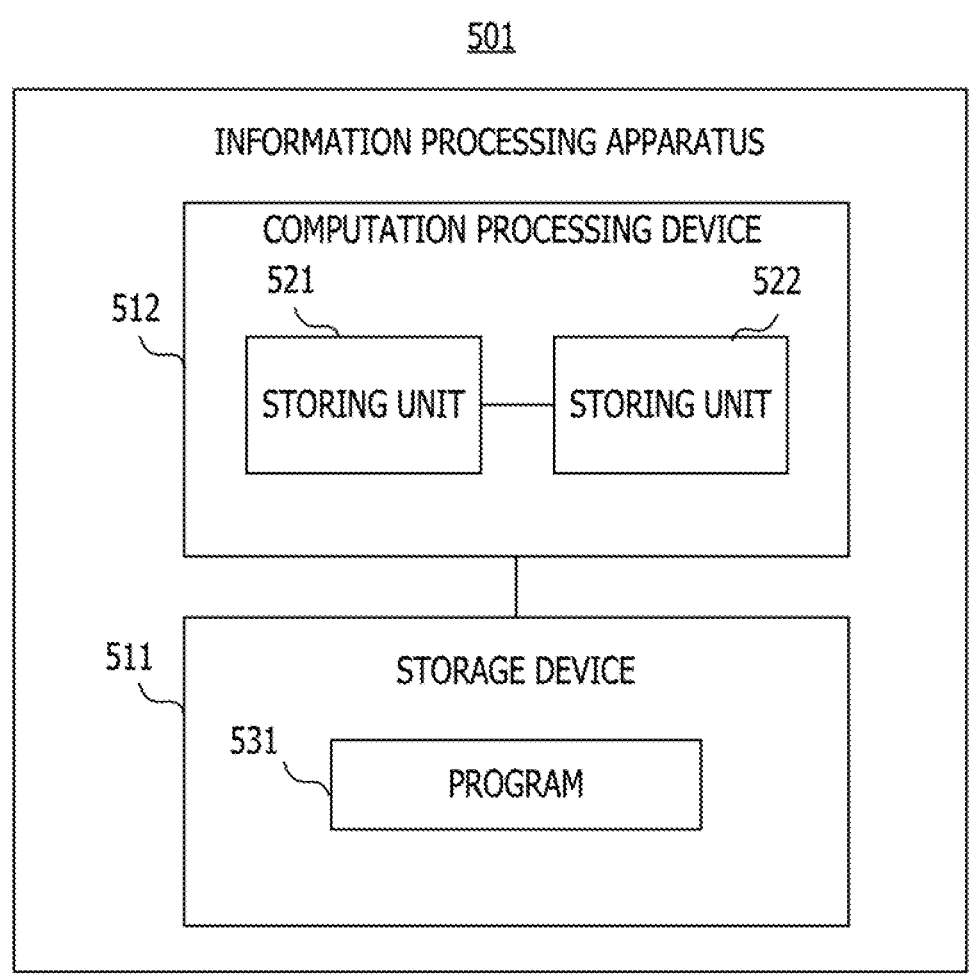
FIG. 5 is a configuration diagram of an information processing apparatus.

FIG. 5 illustrates a configuration example of an information processing apparatus (computer) according to the embodiment. The information processing apparatus 501 in FIG. 5 includes a computation processing device 512 and a storage device 511 that sores a program 531, and the computation processing device 512 includes a storing unit 521 and an execution unit 522.

The storing unit 521 has a storage area for first data that is assigned to computation targets by data definition for the computation targets written in the program 531 and a storage area for second data that is assigned to the computation targets instead of the first data.

The execution unit 522 simplifies the program 531 and executes the simplified program 531. In the case where the execution unit 522 simplifies the program 531 and executes the simplified program 531, and data definition for computation targets is omitted, when a computation using the computation targets occurs, the storing unit 521 outputs the second data to the execution unit 522, and the execution unit 522 uses the second data to perform the computation.

The information processing apparatus 501 in FIG. 5 is capable of avoiding the situation in which computation accuracy is low when a program is simplified to be executed.

Figure 6:
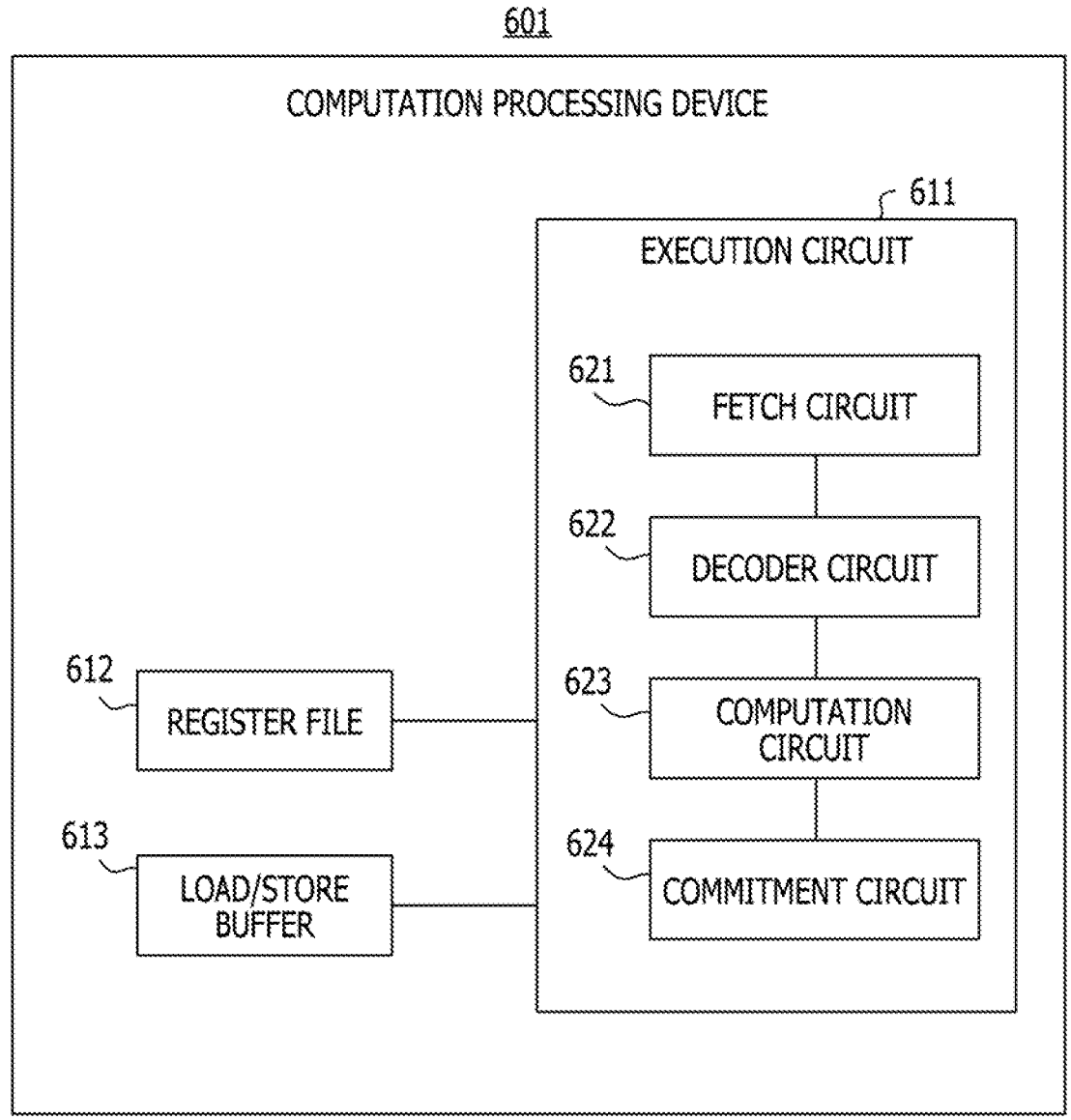
FIG. 6 is a configuration diagram of a computation processing device.

FIG. 6 illustrates a specific example of the computation processing device 512 in FIG. 5. The computation processing device 601 in FIG. 6 includes an execution circuit 611, a register file 612, and a load/store buffer 613. The execution circuit 611 includes a fetch circuit 621, a decoder circuit 622, a computation circuit 623, and a commitment circuit 624. The execution circuit 611 corresponds to the execution unit 522 in FIG. 5, and the register file 612 and the load/store buffer 613 correspond to the storing unit 521 in FIG. 5.

The register file 612 is a storing circuit including multiple registers, and the load/store buffer 613 is a storing circuit that temporarily stores data on computation targets according to a load instruction or a store instruction. The fetch circuit 621 fetches an instruction written in the program 531 from the storage device 511, and the decoder circuit 622 decodes the fetched instruction to determine the type of the instruction. The computation circuit 623 is an arithmetic logic unit (ALU) and executes computation according to instructions from the decoder circuit 622, and the commitment circuit 624 commits the computation result.

The program 531 is an example of a target program to which AC techniques are applied. For example, the program 531 may be a program for big data analysis, machine learning, information search, video processing, or the like. Examples of AC techniques applied to the program 531 include AC parallelization, loop perforation, and task skipping.

The register file 612 or the load/store buffer 613 is provided with auxiliary areas for storing auxiliary data. The auxiliary data is used instead of defined data in the case where data definition for computation targets is omitted.

Figure 7:
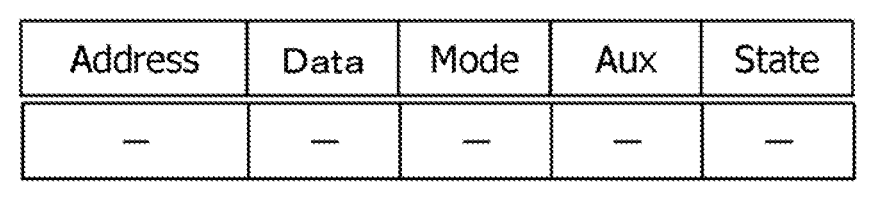

FIG. 7 illustrates an example of the auxiliary areas in the load/store buffer 613. The load/store buffer 613 of FIG. 7 includes storage areas for "Address", "Data", "Mode", "Aux", and "State". Of those, the storage areas for "Mode", "Aux", and "State" correspond to the auxiliary areas.

The item "Address" indicates the address of a variable that is a computation target, and the item "Data" indicates data assigned to the variable. The item "Mode" indicates the execution mode of the program 531, and the item "Aux" indicates auxiliary data assigned to the variable instead of "Data". Data indicated in "Data" is an example of first data, and auxiliary data indicated in "Aux" is an example of second data. The item "State" is state information indicating whether data definition has been performed for the variable. For example, for "Mode", the following three types of execution modes are used:

(1) Execution Mode "0"

The computation processing device 601 executes the program 531 without applying an AC technique.

(2) Execution Mode "1"

The computation processing device 601 applies an AC technique to the program 531 to simplify the program 531 and executes the simplified program 531.

(3) Execution Mode "2"

The computation processing device 601 executes the program 531 without applying an AC technique to generate auxiliary data.

The item "State" stores a setting value indicating that the data definition has been performed or a setting value indicating that the data definition has not been performed.

Figure 8:
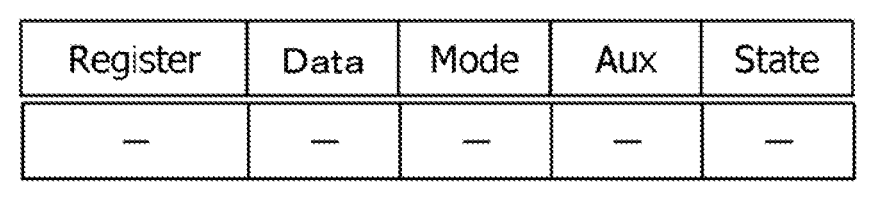

FIG. 8 illustrates an example of the auxiliary areas in the register file 612. The register file 612 of FIG. 8 includes storage areas for "Register", "Data", "Mode", "Aux", and "State". Of those, the storage areas for "Mode", "Aux", and "State" correspond to the auxiliary areas.

The item "Register" indicates the register number of a register that is a computation target, and the item "Data" indicates data assigned to the register. The item "Mode" indicates the execution mode of the program 531, and the item "Aux" indicates auxiliary data assigned to the register instead of "Data". Data indicated in "Data" is an example of first data, and auxiliary data indicated in "Aux" is an example of second data. The item "State" is state information indicating whether data definition has been performed for the register. For the item "Mode", the same execution modes as in "Mode" of the load/store buffer 613 are used.

FIG. 9 illustrates an example of a program created by adding a variable indicating "Mode" in FIG. 7 to the program of FIG. 1B. In the program of FIG. 9, the instructions 901 to 903 are inserted in the program of FIG. 1B, and the if statement 111 is replaced with the if statement 911.

When the instruction 901 is decoded, the computation circuit 623 defines auxiliary areas in the load/store buffer 613 and generates entries for the N elements of array A. The computation circuit 623 then stores auxiliary-data AUX in the storage area for "Aux" of each entry.

FIG. 10 illustrates examples of entries in the load/store buffer 613 generated according to the instruction 901. In the i-th (i=0 to N−1) entry, A+i represents the address of element A[i], and AUX represents the auxiliary data. AUX is specified by the programmer or the compiler for each element A[i]. Auxiliary data generated at the previous program execution may be used as AUX.

When the instruction 902 is decoded, the computation circuit 623 stores "mode" Indicating the execution mode in the storage area for "Mode" in each entry and resets the state information in the storage area for "State" to 0.

FIG. 11 illustrates examples of entries in the load/store buffer 613 in which the execution modes are stored. The word "mode" in each entry means one of the values of "0" to "2". The value of "mode" is specified by the programmer or the compiler, and the same value is set to all the 0-th to (N−1)-th entries. In the storage area for "State", state information=0 means that data definition has not been performed for the variable of the entry.

The If statement 911 is a program for, if loop-counter i is an even number and mode<2, incrementing loop-counter i by 1 and jumping to Loop1Begin. Hence, if loop-counter i is an odd number, or if mode=2, the instruction 101 and the instruction 102 are executed, and data definition for element A[i] is performed. On the other hand, if loop-counter i is an even number and mode<2, the instruction 101 and the instruction 102 are not executed, and data definition for element A[i] is omitted.

When the instruction 102 is decoded, the computation circuit 623 performs the following operation depending on "mode" in the entry having address A+i.

If mode=0, the computation circuit 623 executes the instruction 102 as a normal store instruction and stores the data of variable D into the storage area for "Data" in the entry.

If mode=1, the computation circuit 623 executes the instruction 102 as a normal store instruction and changes the state information in the storage area for "State" in the entry to 1. "State information=1" means that data definition has been performed for the variable of the entry.

If mode=2, the computation circuit 623 executes the instruction 102 as a normal store instruction and stores the data of variable D into the storage area for "Aux" in the entry as auxiliary data.

This allows the execution circuit 611 to read the auxiliary data stored in the storage area for "Aux" from the load/store buffer 613 using an instruction such as get_AC_AUX_DATA (A+i) and use the auxiliary data in the process of the instruction 901 at the next program execution.

When the instruction 103 is decoded, the computation circuit 623 performs the following operation depending on "mode" in the entry having address A+i.

If mode=0 or mode=2, the computation circuit 623 executes the instruction 102 as a normal load instruction and stores the data read from the storage area for "Data" in the entry into variable D. Here, if mode=0, the data read from the storage area for "Data" is undefined data because data definition for element A[i] has been omitted.

If mode=1, the execution circuit 611 performs the following operation depending on the state information in the entry.

If state information=1, the computation circuit 623 executes the instruction 102 as a normal load instruction. If state information=0, the load/store buffer 613 outputs the auxiliary data stored in the storage area for "Aux" in the entry to the commitment circuit 624, and the commitment circuit 624 stores the auxiliary data into variable D.

When the instruction 903 is decoded, the computation circuit 623 discards the N entries generated in the load/store buffer 613.

FIG. 12 illustrates an example of a program created by adding a variable indicating "Mode" In FIG. 8 to the program of FIG. 2B. In the program of FIG. 12, the instructions 1201 to 1203 are inserted in the program of FIG. 2B, and the if statement 211 is replaced with the if statement 1211.

When the instruction 1201 is decoded, the computation circuit 623 defines auxiliary areas in the register file 612 and generates an entry for register R. The computation circuit 623 then stores auxiliary-data AUX in the storage area for "Aux" of the entry.

Figure 13:
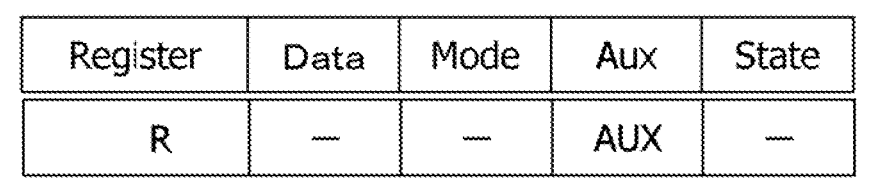

FIG. 13 illustrates an example of an entry in the register file 612 generated according to the instruction 1201. R represents the register number of register R, and AUX represents auxiliary data. AUX is specified by the programmer or the compiler. Auxiliary data generated at the previous program execution may be used as AUX.

When the instruction 1202 is decoded, the computation circuit 623 stores "mode" indicating the execution mode in the storage area for "Mode" of every entry in the register file 612 and resets the state information in the storage area for "State" to 0.

FIG. 14 illustrates examples of entries in the register file 612 in which the execution modes are stored. The register file 612 illustrated in FIG. 14 includes entries for registers R0 to Rn (n is an integer of 0 or more). The word "mode" in each entry means one of the values "0" to "2", and the value of "mode" is specified by the programmer or the compiler. In the storage area for "State", state information=0 means that data definition has not been performed for the variable of the entry.

The if statement 1211 is a program for, if loop-counter i is an even number and mode<2, incrementing loop-counter i by 1, executing the instruction 1212, and jumping to Loop1Begin. Hence, if loop-counter i is an odd number, or if mode=2, the instruction 201 and the instruction 202 are executed, and data definition for register R is performed. On the other hand, if loop-counter i is an even number and mode<2, the instruction 201 and the instruction 202 are not executed, and data definition for register R is omitted.

When the instruction 1212 is decoded, the commitment circuit 624 outputs the register number of register R to the register file 612 and resets the state information in the storage area for "State" included in the entry of register R to 0.

When the instruction 201 is decoded, the commitment circuit 624 outputs the register number of register R to the register file 612, and the computation circuit 623 performs the following operation depending on "mode" in the entry of register R.

If mode=0 or mode=2, the computation circuit 623 executes the instruction 201 as a normal reference instruction and performs calculation using the data read from the storage area for "Data" in the entry. Here, if mode=0, the data read from the storage area for "Data" is undefined data because data definition for register R was omitted.

If mode=1, the computation circuit 623 performs the following operation depending on the state information in the entry.

If state information=1, the computation circuit 623 executes the instruction 201 as a normal reference instruction. If state information=0, the register file 612 outputs the auxiliary data stored in the storage area for "Aux" In the entry to the computation circuit 623, and the computation circuit 623 performs calculation using the auxiliary data.

When the instruction 202 is decoded, the commitment circuit 624 outputs the register number of register R to the register file 612, and the execution circuit 611 performs the following operation depending on "mode" in the entry of register R.

If mode=0, the computation circuit 623 executes the instruction 202 as a normal definition instruction, calculates the data of register R, and stores the resultant into the storage area for "Data" in the entry.

If mode=1, the computation circuit 623 executes the instruction 202 as a normal definition instruction, and the commitment circuit 624 changes the state information in the storage area for "State" in the entry to 1. "State information=1" means that data definition has been performed for the variable of the entry.

If mode=2, the computation circuit 623 executes the instruction 202 as a normal definition instruction and stores the data of register R into the storage area for "Aux" in the entry as auxiliary data.

This allows the execution circuit 611 to read the auxiliary data stored in the storage area for "Aux" from the register file 612 using an instruction such as "get_AC_AUX_DATA®" and use the auxiliary data in the process of the instruction 1201 at the next program execution.

When the instruction 1203 is decoded, the computation circuit 623 dears the storage areas for "Mode", "Aux", and "State" in all the entries in the register file 612.

FIG. 15 illustrates an example of a program created by adding a variable indicating "Mode" in FIG. 7 to the program of FIG. 4B. In the program 1502 in FIG. 15, the instructions 1511 to 1513 are inserted in the program 405 in FIG. 4B, and the library 404 is replaced with the library 1501.

The operation at the time when the instructions 1511 to 1513 are decoded is the same as the operation at the time when the instructions 901 to 903 in FIG. 9 are decoded.

The operation at the time when the loop body 411 in the library 401 is executed is the same as the operation at the time the instruction 101 and the instruction 102 in FIG. 9 are decoded. Hence, if mode=1, the computation circuit 623 changes the state information in the storage area for "State" in the entry having address A+i to 1, and If mode=2, the computation circuit 623 stores the data of variable D into the storage area for "Aux" in the entry as auxiliary data.

The operation at the time when the process 415 after the loop execution is executed is the same as the operation at the time when the process of Loop2 in FIG. 9 is executed. Hence, if mode=i and state information=0, the load/store buffer 613 outputs the auxiliary data stored in the storage area for "Aux" in the entry having address A+i to the commitment circuit 624. The commitment circuit 624 stores the auxiliary data into variable D, and the computation circuit 623 adds the auxiliary data in variable D to the data of the variable sum.

When the instruction 416 is decoded, the library 1501 is called, and the execution circuit 611 performs the following operation depending on "mode" in the entry having address A+i.

If mode=0, the execution circuit 611 does nothing. If mode=2, the execution circuit 611 waits for the execution of the N threads to be completed as in the library 402 in FIG. 4A. If mode=1, the execution circuit 611 cancels the execution of the remaining threads as in the library 404 in FIG. 4B when M threads are completed or when the execution time reaches T. In this case, data definition for part of elements A[i] is omitted.

With the computation processing device 601 of FIG. 6, since auxiliary data is stored in auxiliary areas in the register file 612 or the load/store buffer 613, in the case where data definition for registers or variables is omitted, it is possible to perform computation using the auxiliary data. Thus, even in the case where data definition is omitted due to the application of AC techniques, the cooperative operation of software and hardware provides data appropriately, making it possible to avoid the situation in which computation accuracy is low. This makes it possible to achieve high-speed program execution, reduce electric power consumption, and expand the application range of AC techniques.

Since state information is stored in auxiliary areas in the register file 612 or the load/store buffer 613, it is possible to determine whether data definition has been performed, using hardware. Thus, there is no overhead for software determining whether data definition has been performed, and this makes the speed of the instruction process higher.

FIG. 16 is a flowchart illustrating an example of an instruction process that the computation processing device 601 in FIG. 6 performs when executing a program as illustrated in FIGS. 9, 12, and 15. The execution circuit 611 first defines auxiliary areas in the storing unit and resets the state information in "State" to 0 (step 1601). In the case of a program in FIG. 9 or 15, the load/store buffer 613 is used as the storing unit, and in the case of a program in FIG. 12, the register file 612 is used as the storing unit.

The execution circuit 611 next performs the following operation depending on the value of "mode" set in "Mode" in the auxiliary area for the computation target (step 1602).

If mode=0, the execution circuit 611 executes instructions without applying an AC technique (step 1603).

If mode=2, the execution circuit 611 executes instructions without applying an AC technique, generates auxiliary data, and stores the auxiliary data in "Aux" in the auxiliary area (step 1609).

For example, the execution circuit 611 executes instructions without applying an AC technique and generates data of the computation target, and the execution circuit 611 stores the generated data into "Data" in the storing unit and also stores the same data into "Aux" as auxiliary data. With this, data generated by data definition of a program that is not simplified is stored as auxiliary data, and this improves the accuracy of computation using the auxiliary data. Data generated by executing instructions without applying an AC technique is an example of third data.

The execution circuit 611 may repeat several times the operation of executing a program without applying an AC technique and generate multiple pieces of data defined for the same computation target, and the execution circuit 611 may store the statistical value of those pieces of data into "Aux" as auxiliary data. Examples of the statistical value of multiple pieces of data include average, median, and mode. Even in the case where different data is generated every time a not-simplified program is executed, the use of a statistical value of those pieces of data as auxiliary data makes it possible to keep the accuracy of computation using the auxiliary data at a certain level.

If mode=1, the execution circuit 611 executes instructions applying an AC technique (step 1604), and if the data of a computation target is defined, the execution circuit 611 changes the state information in "State" of the computation target to 1 (step 1605). The execution circuit 611 then performs the following operation depending on the state information in "State" (step 1606).

If state information=1 (NO at step 1606), the storing unit outputs the data stored in "Data" to the computation circuit 623, and the computation circuit 623 performs computation using the data (step 1607). If state information=0 (YES at step 1606), the storing unit outputs the auxiliary data stored in "Aux" to the computation circuit 623, and the computation circuit 623 performs computation using the auxiliary data (step 1608).

Next described is a method of automatically generating a program illustrated in FIG. 9, 12, or 15 from a program written in source code with reference to FIGS. 17A to 23.

The execution circuit 611 analyzes a program written in source code by executing a compiler and selects computation targets for which auxiliary areas are to be provided among multiple computation targets written in the program. The execution circuit 611 then inserts control instructions to control the auxiliary areas into the program. With this, a program to which an AC technique is applied is automatically generated, and this reduces the workload on the programmer.

FIGS. 17A and 17B illustrate an example of a first conversion process to convert a program written in source code into an intermediate language expression. FIG. 17A illustrates an example of a program written in source code, and FIG. 17B illustrates an example of a program of an intermediate language expression.

FIGS. 18A to 18C illustrate examples of instructions inserted in the program of FIG. 178 for the case where the computation targets are the elements of array A, and FIG. 19 illustrates an example of a program generated from the program of FIG. 178.

The execution circuit 611 first converts the program of FIG. 17A to the program of FIG. 178 with a compiler. The execution circuit 611 then detects that the process from LoopBegin to LoopEnd in FIG. 178 is a loop process, that variable i is the loop counter, and that variable N is the threshold for determining the end of the loop process.

For example, in the case where the program of the loop body in FIG. 17B includes a store instruction to store data into memory such as "store D→[A+i]", it is possible for the execution circuit 611 to extract information as below.

(P1) The address of the first element A[0] of array A which is the access target is A+0.

(P2) The access range of array A is from A+0 to A+N−1.

Then, based on the extracted information, the execution circuit 611 inserts the instructions illustrated in FIG. 18A immediately before LoopBegin in FIG. 17B and inserts the instruction illustrated in FIG. 18 immediately after LoopBegin.

The execution circuit 611 next analyzes the process after the loop execution in FIG. 17B and detects the last position at which array A is referred to. The execution circuit 611 then inserts a label "END" immediately after the detected position and inserts the instruction illustrated in FIG. 18C immediately after the label. With this, the program of FIG. 19 is automatically generated from the program of FIG. 176.

The instructions of FIGS. 18A and 18C are examples of control instructions to control auxiliary areas.

FIGS. 20A to 20C illustrate examples of instructions inserted in the program of FIG. 176 for the case where the computation target is the register, and FIG. 21 illustrates an example of a program generated from the program of FIG. 17B.

For example, in the case where the program of the loop body in FIG. 176 includes an instruction to define the register after the register is used such as "mult R, . . . → . . . " and " . . . →R", it is possible for the execution circuit 611 to extract information as below.

(P3) The access target is register R.

Then, based on the extracted information, the execution circuit 611 inserts the instructions illustrated in FIG. 20A immediately before LoopBegin in FIG. 175 and inserts the instruction illustrated in FIG. 20B immediately after LoopBegin.

The execution circuit 611 next analyzes the process after the loop execution in FIG. 17B and detects the last position at which register R is referred to. The execution circuit 611 then inserts a label "END" immediately after the detected position and inserts the instruction illustrated in FIG. 20C immediately after the label. With this, the program of FIG. 21 is automatically generated from the program of FIG. 17B. The instructions of FIGS. 20A and 20C are examples of control instructions to control auxiliary areas.

FIGS. 22A to 22C illustrate an example of a second conversion process to convert a program for parallel processing written in source code into an intermediate language expression. FIG. 22A illustrates an example of a program written in source code, FIG. 22B illustrates an example of a program of an intermediate language expression, and FIG. 22C illustrates an example of a library of function func in FIG. 22. FIG. 23 illustrates an example of a program generated from the program of FIG. 225 for the case where the computation targets are elements of array A.

The execution circuit 611 first converts the program of FIG. 22A to the program of FIG. 22B with a compiler. The execution circuit 611 then detects that the process from LoopBegin to LoopEnd in FIG. 228 is a loop process, that variable i is the loop counter, and that variable N is the threshold for determining the end of the loop process.

For example, in the case where the program of the loop body in FIG. 22C includes a store instruction to store data into memory such as "store D→[A+i]", it is possible for the execution circuit 611 to extract the information in (P1) and (P2) described above.

Then, based on the extracted information, the execution circuit 611 inserts the instructions illustrated in FIG. 18A immediately before LoopBegin in FIG. 22B and changes barrier ( ) to AC_barrier (mode) illustrated in FIG. 15.

The execution circuit 611 next analyzes the process after the loop execution in FIG. 22B and detects the last position at which array A is referred to. The execution circuit 611 then inserts a label "END" immediately after the detected position and inserts the instruction illustrated in FIG. 18C immediately after the label. With this, the program of FIG. 23 is automatically generated from the program of FIG. 22B.

The configuration of the information processing apparatus 501 in FIG. 5 is merely an example, and part of the constituents may be omitted or changed depending on the application or conditions of the information processing apparatus 501. The configuration of the computation processing device 601 of FIG. 6 is merely an example, and part of the constituents may be omitted or changed depending on the application or conditions of the computation processing device 601.

The flowchart of FIG. 16 is illustrative only, and part of the processes may be omitted or changed depending on the configuration or conditions of the computation processing device 601.

The programs illustrated in FIGS. 1A to 2B, 4A and 4B, 9, 12, 15, and 17A to 23 are mere examples, and the program changes depending on the application or conditions of the computation processing device 601. The parallel processing illustrated in FIGS. 3A to 3C is a mere example, and the number of subtasks executed in parallel processing varies according to the program. The auxiliary areas illustrated in FIGS. 7, 8, 10, 11, 13 and 14 are mere examples, and part of the information may be omitted or changed depending on the application or conditions of the computation processing device 601.

Figure 24:
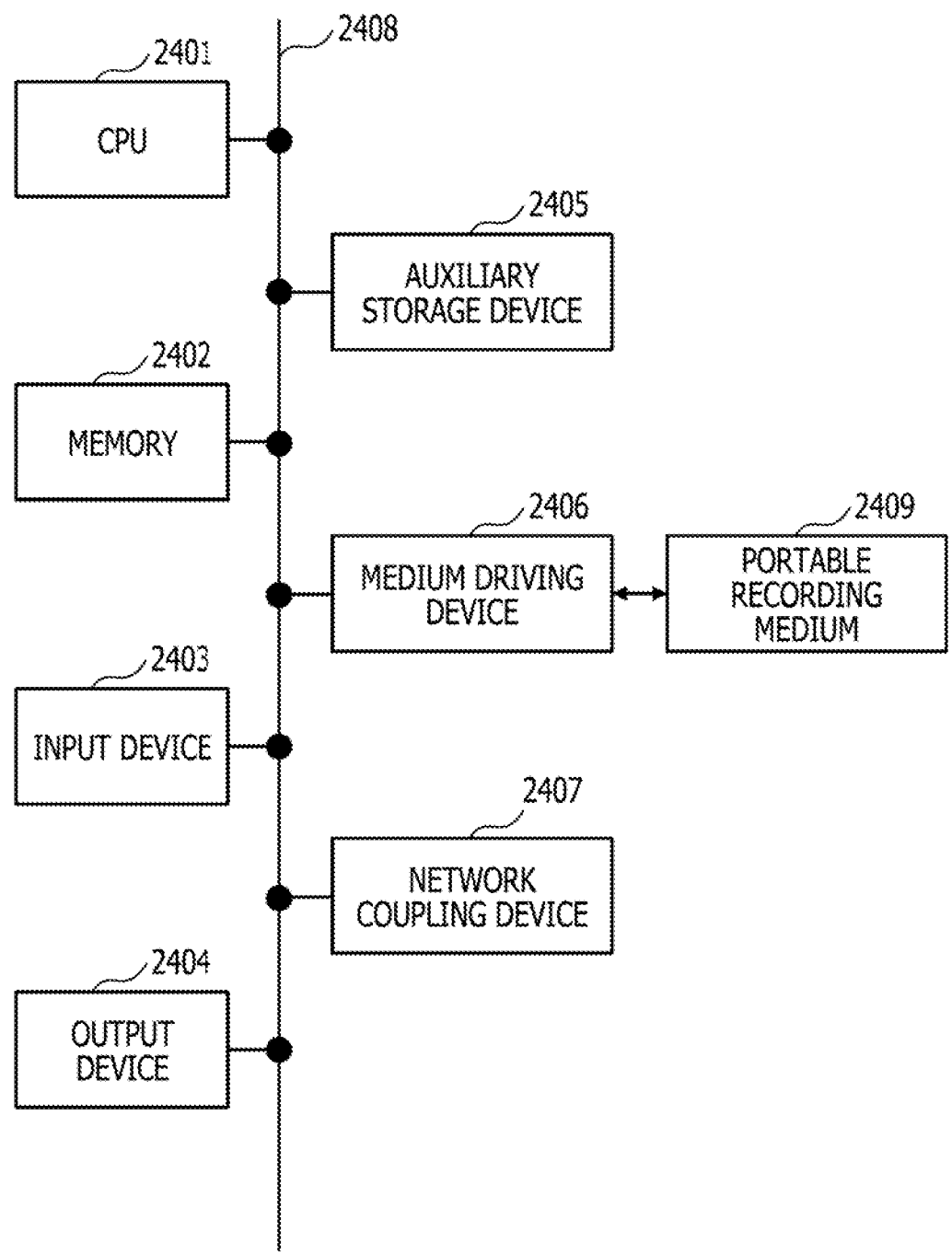
FIG. 24 is a hardware configuration diagram of the information processing apparatus.

FIG. 24 illustrates an example of the hardware configuration of the information processing apparatus 501 in FIG. 5. The information processing apparatus of FIG. 24 includes a central processing unit (CPU) 2401, memory 2402, an input device 2403, an output device 2404, an auxiliary storage device 2405, a medium driving device 2406, and a network coupling device 2407. These constituents are hardware and coupled with one another via a bus 2408.

The memory 2402 is, for example, semiconductor memory such as read-only memory (ROM), random-access memory (RAM), or flash memory and stores programs and data used for processing. The memory 2402 may be used as the storage device 511 in FIG. 5.

The CPU 2401 is a processor that executes programs using the memory 2402. The CPU 2401 may be used as the computation processing device 512 in FIG. 5.

The input device 2403 is, for example, a keyboard, a pointing device, or the like and is used for receiving instructions or input of information from the operator or the user. The output device 2404 is, for example, a display, a printer, a speaker, or the like and is used for outputting questions or instructions to the operator or the user and processing results. The processing results may be execution results of programs.

The auxiliary storage device 2405 is, for example, a magnetic disk device, an optical disk device, a magneto-optical disk device, a tape device, or the like. The auxiliary storage device 2405 may be a hard disk drive or flash memory. The information processing apparatus may store programs and data in the auxiliary storage device 2405 and load the programs and data into the memory 2402 for use.

The medium driving device 2406 drives a portable recording medium 2409 and accesses recorded contents therein. The portable recording medium 2409 is a memory device, a flexible disk, an optical disk, a magneto-optical disk, or the like. The portable recording medium 2409 may be a Compact Disk Read-Only Memory (CD-ROM), a Digital Versatile Disk (DVD), a Universal Serial Bus (USB) memory, or the like. The operator or the user may store programs and data in the portable recording medium 2409 and load the programs and data into the memory 2402 for use.

As above, the computer-readable recording medium that stores programs and data used for processing is a physical (non-transitory) recording medium such as the memory 2402, the auxiliary storage device 2405, or the portable recording medium 2409.

The network coupling device 2407 is a communication interface circuit that is coupled to a communication network such as a local area network (LAN) or a wide area network (WAN) and performs data conversion associated with communication. The information processing apparatus may receive programs and data from an external device through the network coupling device 2407 and load the programs and data into the memory 2402 for use.

The information processing apparatus does not have to include all the constituents in FIG. 24, and part of the constituents may be omitted according to the application or conditions. For example, in the case where an interface with the operator or the user is unnecessary, the input device 2403 and the output device 2404 may be omitted. In the case where the portable recording medium 2409 or the communication network is not used, the medium driving device 2406 or the network coupling device 2407 may be omitted.

Although an embodiment of the disclosure and advantages thereof have been described in details, various modifications, additions, and omissions may be made by those skilled in the art without departing from the scope of the present disclosure explicitly described in the claims.

With regard to the embodiment described with reference to FIGS. 1A to 24, the following appendices are further disclosed.

(Appendix 1)

An Information processing apparatus comprising: a storage device that stores a program; and a computation processing device, wherein the computation processing device includes a storing unit including a storage area for first data that is assigned to a computation target by data definition for the computation target written in the program and a storage area for second data that is assigned to the computation target instead of the first data, and an execution unit that simplifies the program and executes the simplified program, the data definition for the computation target is omitted by the execution unit simplifying the program and executing the simplified program, and in a case where a computation using the computation target occurs, the storing unit outputs the second data to the execution unit, and the execution unit performs the computation using the second data.

(Appendix 2)

The information processing apparatus according to appendix 1, wherein before simplifying the program and executing the simplified program, the execution unit executes the program without simplifying the program, generates third data by the data definition for the computation target, determines the second data based on the third data, and stores the determined second data in the storage area for the second data.

(Appendix 3)

The information processing apparatus according to appendix 2, wherein before simplifying the program and executing the simplified program, the execution unit repeats an operation of executing the program multiple times without simplifying the program, generates multiple pieces of data including the third data by the data definition for the computation target, and determines a statistical value of the multiple pieces of data as the second data.

(Appendix 4)

The information processing apparatus according to any one of appendices 1 to 3, wherein the storing unit further includes a storage area for state information indicating whether data definition has been performed for the computation target, in a case where data definition is performed for the computation target when the execution unit simplifies the program and executes the simplified program, the execution unit stores data generated by the data definition for the computation target into the storage area for the first data and sets a setting value indicating that the data definition has been performed, in the storage area for the state information, and when a computation using the computation target occurs, if the setting value is set in the storage area for the state information, the storing unit outputs the first data to the execution unit, and if the setting value is not set in the storage area for the state information, the storing unit outputs the second data to the execution unit.

(Appendix 5)

The information processing apparatus according to any one of appendices 1 to 4, wherein before simplifying the program and executing the simplified program, the execution unit analyzes the program with a compiler, selects the computation target for which the storage area for the second data is to be provided out of multiple computation targets written in the program, and inserts a control instruction to control the storage area for the second data into the program.

(Appendix 6)

The information processing apparatus according to any one of appendices 1 to 5, wherein the execution unit simplifies the program by applying, to the program, a process of cancelling in the middle a waiting process of waiting for multiple processes being executed in parallel to be completed, a process of skipping part of repetition of a loop process, or a process of skipping part of program code, and the execution unit executes the simplified program.

(Appendix 7)

An information processing program for a computer, wherein the information processing program causes a computation processing device of the computer to simplify a target program and execute the simplified target program, the computation processing device includes a storage area for first data that is assigned to a computation target by data definition for the computation target written in the target program and a storage area for second data that is assigned to the computation target instead of the first data, the data definition for the computation target is omitted by simplifying the target program and executing the simplified target program, and in a case where a computation using the computation target occurs, the computation is performed using the second data.

(Appendix 8)

The information processing program according to appendix 7, wherein the information processing program causes the computation processing device to further execute a process of, before simplifying the target program and executing the simplified target program, executing the target program without simplifying the target program, generating third data by the data definition for the computation target, determining the second data based on the third data, and storing the determined second data in the storage area for the second data.

(Appendix 9)

The information processing program according to appendix 8, wherein before simplifying the target program and executing the simplified target program, the computation processing device repeats an operation of executing the target program multiple times without simplifying the target program, generates multiple pieces of data including the third data by the data definition for the computation target, and determines a statistical value of the multiple pieces of data as the second data.

(Appendix 10)

The information processing program according to any one of appendices 7 to 9, wherein the computation processing device further includes a storage area for state information indicating whether data definition has been performed for the computation target, in a case where data definition is performed for the computation target when the computation processing device simplifies the target program and executes the simplified target program, the computation processing device stores data generated by the data definition for the computation target into the storage area for the first data and sets a setting value indicating that the data definition has been performed, in the storage area for the state information, and when a computation using the computation target occurs, if the setting value is set in the storage area for the state information, the computation processing device performs the computation using the first data, and if the setting value is not set in the storage area for the state information, the computation processing device performs the computation using the second data.

(Appendix 11)

An information processing method executed by a computer, wherein a computation processing device of the computer includes a storage area for first data that is assigned to a computation target by data definition for the computation target written in a program and a storage area for second data that is assigned to the computation target instead of the first data, the computer simplifies the program and executes the simplified program, and in a case where the data definition for the computation target is omitted by simplifying the program and executing the simplified program, and where a computation using the computation target occurs, the computer performs the computation using the second data.

(Appendix 12)

The information processing method according to appendix 11, wherein before simplifying the program and executing the simplified program, the computer executes the program without simplifying the program, generates third data by the data definition for the computation target, determines the second data based on the third data, and stores the determined second data in the storage area for the second data.

(Appendix 13)

The information processing method according to appendix 12, wherein before simplifying the program and executing the simplified program, the computer repeats an operation of executing the program multiple times without simplifying the program, generates multiple pieces of data including the third data by the data definition for the computation target, and determines a statistical value of the multiple pieces of data as the second data.

(Appendix 14)

The information processing method according to any one of appendices 11 to 13, wherein the computation processing device further includes a storage area for state information indicating whether data definition has been performed for the computation target, in a case where data definition is performed for the computation target when the computer simplifies the program and executing the simplified program, the computer stores data generated by the data definition for the computation target into the storage area for the first data and sets a setting value indicating that the data definition has been performed, in the storage area for the state information, and when a computation using the computation target occurs, if the setting value is set in the storage area for the state information, the computer performs the computation using the first data, and if the setting value is not set in the storage area for the state information, the computer performs the computation using the second data.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus, comprising:
a computation processing device that includes a memory and a processor coupled to the memory; and
a storage device that stores a program,
wherein the processor is configured to:
store, in the memory, a first storage area for first data that is assigned to a computation target by data definition for the computation target written in the program and a second storage area for second data that is assigned to the computation target instead of the first data,
simplify the program,
when the data definition for the computation target is omitted by executing the simplified program, output the second data from the memory, and
perform the computation by using the output second data.

2. The information processing apparatus according to claim 1, wherein the processor is configured to:
before simplifying the program and executing the simplified program, execute the program without simplifying the program,
generate third data by the data definition for the computation target,
determine the second data based on the third data, and
store the determined second data in the second storage area for the second data.

3. The information processing apparatus according to claim 2, wherein the processor is configured to:
before simplifying the program and executing the simplified program, repeat an operation of executing the program multiple times without simplifying the program,
generate multiple pieces of data including the third data by the data definition for the computation target, and
determine a statistical value of the multiple pieces of data as the second data.

4. The information processing apparatus according to claim 1, wherein the processor is configured to:
store, in the memory, a third storage area for state information indicating whether data definition has been performed for the computation target,
when data definition is performed for the computation target in a period in which the program is simplified and the simplified program is executed, store data generated by the data definition for the computation target into the first storage area for the first data and set a setting value indicating that the data definition has been performed in the third storage area for the state information,
when a computation using the computation target occurs and when the setting value is set in the third storage area for the state information, output the second data.

5. The information processing apparatus according to claim 1, wherein the processor is configured to:
before simplifying the program and executing the simplified program, analyze the program with a compiler,
select the computation target for which the second storage area for the second data is to be provided out of multiple computation targets written in the program, and
insert a control instruction to control the second storage area for the second data into the program.

6. A non-transitory computer-readable storage medium storing a program that causes a computer to execute a process, the process comprising:
storing, in a memory, a first storage area for first data that is assigned to a computation target by data definition for the computation target written in a target program and a second storage area for second data that is assigned to the computation target instead of the first data;
simplifying the target program;
when the data definition for the computation target is omitted by executing the simplified target program, outputting the second data from the memory; and
performing the computation by using the output second data.

7. An information processing method executed by a computer, the information processing method comprising:
storing, in a memory, a first storage area for first data that is assigned to a computation target by data definition for the computation target written in a target program and a second storage area for second data that is assigned to the computation target instead of the first data;
simplifying the target program;
when the data definition for the computation target is omitted by executing the simplified target program, output the second data from the memory; and
performing the computation by using the output second data.

8. The information processing method according to claim 7, the method further comprising:
before simplifying the target program and executing the simplified target program, executing the target program without simplifying the target program;
generating third data by the data definition for the computation target;
determining the second data based on the third data; and
storing the determined second data in the second storage area for the second data.

9. The information processing method according to claim 8, the method further comprising:
before simplifying the target program and executing the simplified target program, repeating an operation of executing the target program multiple times without simplifying the target program;
generating multiple pieces of data including the third data by the data definition for the computation target; and
determining a statistical value of the multiple pieces of data as the second data.

10. The information processing method according to claim 7, the method further comprising:
storing, in the memory, a third storage area for state information indicating whether data definition has been performed for the computation target;
when data definition is performed for the computation target in a period in which the target program is simplified and the simplified target program is executed, storing data generated by the data definition for the computation target into the first storage area for the first data and setting a setting value indicating that the data definition has been performed in the third storage area for the state information; and
when a computation using the computation target occurs and when the setting value is set in the third storage area for the state information, outputting the second data.

\* \* \* \* \*